US010578117B2

(12) United States Patent
Barthes et al.

(10) Patent No.: US 10,578,117 B2
(45) Date of Patent: Mar. 3, 2020

(54) ROTOR ASSEMBLY AND TURBINE ENGINE WITH GAS BEARINGS INCLUDING SUCH A ROTOR ASSEMBLY

(71) Applicant: LIEBHERR-AEROSPACE TOULOUSE SAS, Toulouse (FR)

(72) Inventors: Guillaume Barthes, Toulouse (FR); Laurent Chapillon, Saint-Sardos (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 205 days.

(21) Appl. No.: 15/562,198

(22) PCT Filed: Apr. 1, 2016

(86) PCT No.: PCT/FR2016/050750
§ 371 (c)(1),
(2) Date: Sep. 27, 2017

(87) PCT Pub. No.: WO2016/156757
PCT Pub. Date: Oct. 6, 2016

(65) Prior Publication Data
US 2018/0062467 A1 Mar. 1, 2018

(30) Foreign Application Priority Data
Apr. 1, 2015 (FR) ...................... 15 52789

(51) Int. Cl.
*F04D 29/26* (2006.01)
*F01D 15/10* (2006.01)
(Continued)

(52) U.S. Cl.
CPC ........... *F04D 29/266* (2013.01); *F01D 5/025* (2013.01); *F01D 15/10* (2013.01); *F02B 37/10* (2013.01);
(Continued)

(58) Field of Classification Search
CPC ............. F05D 2220/40; F05D 2220/76; F04D 29/266; F04D 29/057; F01D 5/025;
(Continued)

(56) References Cited

U.S. PATENT DOCUMENTS

| 4,986,733 A | 1/1991 | Fleury et al. |
| 5,193,989 A | 3/1993 | Fleury et al. |

(Continued)

FOREIGN PATENT DOCUMENTS

| DE | 102013021192 A1 | 7/2014 |
| EP | 0629013 A2 | 12/1994 |

(Continued)

*Primary Examiner* — Peter J Bertheaud
(74) *Attorney, Agent, or Firm* — Volpe and Koenig, P.C.

(57) ABSTRACT

A rotor assembly is presented for a turbine engine with gas bearings including a solid permanent magnet with no central bore. The rotor assembly also includes a first shaft having at least one bearing intended for engaging with a support bearing to form a gas bearing and ensure rotational guidance of the first shaft as well as a thrust disk. The solid permanent magnet is press-fitted inside a band made of a nonmagnetic material, the band is integral with the first shaft in an extension thereof, and a second shaft has at least one bearing intended for engaging with a support bearing to form a second gas bearing and ensure rotational guidance of the second shaft, coaxially with the first shaft such that the first shaft, the band, and the second shaft form an integral assembly.

17 Claims, 1 Drawing Sheet

(51) Int. Cl.
| | |
|---|---|
| *F04D 29/057* | (2006.01) |
| *F01D 5/02* | (2006.01) |
| *F02B 39/10* | (2006.01) |
| *F02B 37/10* | (2006.01) |
| *H02K 1/27* | (2006.01) |
| *F04D 29/053* | (2006.01) |
| *F04D 25/06* | (2006.01) |
| *F01D 15/08* | (2006.01) |
| *F04D 29/28* | (2006.01) |

(52) U.S. Cl.
CPC ............ *F02B 39/10* (2013.01); *F04D 29/057* (2013.01); *H02K 1/27* (2013.01); *H02K 1/2706* (2013.01); *F01D 15/08* (2013.01); *F04D 25/06* (2013.01); *F04D 25/064* (2013.01); *F04D 25/0606* (2013.01); *F04D 29/053* (2013.01); *F04D 29/284* (2013.01); *F05D 2220/40* (2013.01); *F05D 2220/76* (2013.01)

(58) Field of Classification Search
CPC .......... F01D 15/10; F02B 39/10; F02B 37/10; H02K 1/27; H02K 1/2706
See application file for complete search history.

(56) References Cited

U.S. PATENT DOCUMENTS

| | | | | |
|---|---|---|---|---|
| 5,961,247 | A  * | 10/1999 | Gold | F01D 5/025 403/369 |
| 6,198,174 | B1 * | 3/2001 | Nims | F01D 15/10 290/52 |
| 6,998,756 | B2 * | 2/2006 | Ishii | F01D 5/026 310/152 |
| 7,722,336 | B2 * | 5/2010 | Vaccarezza | F01D 5/025 416/204 R |
| 2004/0005228 | A1 | 1/2004 | Agrawal et al. | |
| 2011/0044110 | A1 | 2/2011 | Widjaja | |
| 2011/0243485 | A1 | 10/2011 | Kume et al. | |
| 2012/0051952 | A1 | 3/2012 | Knoop et al. | |
| 2014/0186745 | A1 * | 7/2014 | Metz | F04D 25/0606 429/514 |

FOREIGN PATENT DOCUMENTS

| | | |
|---|---|---|
| JP | 2010119264 A | 5/2010 |
| WO | 2007072536 A1 | 6/2007 |
| WO | 2011044110 A2 | 4/2011 |
| WO | 2013028521 A1 | 2/2013 |
| WO | 2014003563 A1 | 1/2014 |
| WO | 2014080087 A1 | 5/2014 |

* cited by examiner

ROTOR ASSEMBLY AND TURBINE ENGINE WITH GAS BEARINGS INCLUDING SUCH A ROTOR ASSEMBLY

FIELD OF THE INVENTION

The present invention relates to a rotor assembly and a turbine engine with gas bearings including such a rotor assembly. Such engine is intended for rotating at very high rates. Due to high rotational rates, it is indeed possible to create, on the rotor bearings, a gas (air) film which holds the rotor, allowing it to rotate without contacting the stator.

BACKGROUND

A turbine engine is a device allowing the recovery of energy from a fluid and/or providing energy to a fluid. For example, an expansion turbine may be recovering mechanical energy from a gaseous or liquid flow and thus driving a mechanical system. This energy may also be used to be communicated to another fluid, e.g. for compressing it. A turbine may also be driven by a motor, e.g. an electric motor.

The invention described hereafter has been implemented in the field of turbine engines used for feeding compressed air to a fuel-cell in an auto vehicle. However, other applications may be considered, such as for example a use in an air conditioning system in the aeronautical sector or in the railway sector for example.

In applications such as the ones mentioned above, it is required to have very high rotational rates so as to obtain high efficiency and to avoid a negative influence on the overall efficiency of the fuel-cell (or another system, e.g. an air conditioning system). The rotational rates to consider here are at least 100,000 rpm. At such rotational rates, it is required to have an excellent positioning of the mobile parts with respect to each other and to the able to guarantee that this relative positioning does not evolve with time so as to avoid creating unbalance. Furthermore, it is required to provide, for the rotating parts, contactless bearings, e.g. gas or aerodynamic bearings.

In turbine engines known in the prior art, the mobile assembly consists in an assembly of tubular parts positioned with respect to each other and held in their position by axial clamping ensured by a tie rod crossing at least part of the assembly of parts. US2014/0186745 illustrates, for example, such set up.

Considering the rotational rates of the mobile assembly, balancing this assembly must be performed before operating the turbine engine. When this assembly includes a turbine wheel and a compressor wheel, these wheels generally have a larger diameter than the bearings supporting the assembly. Dismantling must thus be considered for inserting the mobile assembly in its bearings after its balancing. It is required to then keep the precise angular and radial positioning during reassembling so as to avoid unbalance. Tracking is then performed on the parts forming the mobile assembly so as to reassemble them in the same relative position.

WO2013/028521 discloses an air feed device for a fuel cell, having a shaft, a compressor wheel which is arranged in a compressor housing and which is fastened to one of the ends of the shaft, a bearing arrangement which is arranged in a bearing housing for mounting the shaft and an electric motor for driving the shaft, which electric motor is arranged in the bearing housing, wherein the shaft has two shaft bearing portions which are formed as separate components, and has a magnet portion which is arranged between the shaft seat portions and forms a separate component and forms the rotor of the electric motor, the shaft bearing portions and the magnet portion being braced against one another, and the shaft bearing portions and the magnet portion being centered relative to one another by means of a centring arrangement which engages on an outer edge, the shaft bearing portions and the magnet portion, bearing in each case axially against one another.

A disadvantage of an assembly such as presented above is that it includes a number of stacked parts which is relatively high. Therefore, adding the manufacturing and assembling tolerances leads to difficulties to reach the balancing qualities required to operate at high rates. Indeed, this design implies creating an internal momentum which limits reachable rates.

There are also turbine engines having a solid integral shaft with a diameter which is still small so as to reach high rotational rates (see for example U.S. Pat. No. 4,986,733). The shaft ends are threaded and each receives a wheel with the corresponding tapping. Precise wheel positioning is ensured by an intermediate part between the shaft and the wheel. Due to precise machining with tight geometrical and dimensional tolerances, it is thus possible to avoid unbalance when mounting each wheel.

Such turbine engines are not designed to receive a magnet and thus form the rotor of an electric motor. If a magnet is fitted around the solid shaft, reachable rotational rates are below the required rates for air feeding a fuel-cell for example. Furthermore, such structure may only be considered for small shaft end diameters. As soon as the diameter increases, the centrifugal stress and the differential dilatation between a wheel made of light alloy and the shaft made of an alloy with high mechanical characteristics do not allow guaranteeing good relative positioning of the rotational parts.

One objective of the present invention is then to provide a turbine engine architecture integrating an electric motor allowing good balancing with good repeatability of this balancing. Such turbine engine will preferably be compact and/or will have good energy efficiency.

SUMMARY

For this purpose, the present invention presents a rotor assembly for a turbine engine with gas bearings including a permanent magnet, a first shaft having at least one bearing intended for engaging with a support bearing to form a gas bearing and ensure rotational guidance of the first shaft as well as a thrust disk.

According to the present invention, the permanent magnet is a solid magnet which is press-fitted inside a band made of a nonmagnetic material; the band forms an integral assembly with the first shaft in the extension thereof, and a second shaft has at least one bearing intended for engaging with a support bearing to form a gas bearing and ensure rotational guidance of the second shaft, coaxially with the first shaft such that the first shaft, the band, and the second shaft form an integral assembly.

This new rotor assembly architecture thus provides an integral assembly allowing to perform balancing out of a turbine engine and to avoid modifying this balancing when the assembly is subsequently mounted in the turbine engine. The nonmagnetic material for making the band and having a solid magnet allows optimizing the electric motor in which the rotor will be placed. It is thus possible to optimize this electric motor, in particular in terms of weight and overall dimensions.

It is possible to provide a single tubular part, preferably made of a nonmagnetic material, inside which a permanent magnet will be placed and which would thus form the band, with the first shaft on a first side thereof and the second shaft on the other side thereof. However, a preferred embodiment provides that the band is welded on both the first shaft and the second shaft. This solution allows the use of different materials on the band and the bearings of the integral assembly and hence choosing the materials used in compliance with the function they must fulfil.

In order to optimize the rotor assembly, it is advantageously provided that the first shaft and the second shaft are each a tubular shaft.

An embodiment of a rotor assembly such as described here provides that the first shaft holds, opposite the band, a compressor wheel. This wheel, driven for example by the motor of which the magnet and the band form the rotor, then allows pressure-feeding air to a fuel-cell. Several setups of the compressor wheel may be considered (non-exhaustive list):

the compressor wheel may include a thread engaging with a tapping performed at an end of the first shaft: this solution has an excellent runnability when the compressor wheel is made of a material with a dilatation coefficient higher than that of the first shaft and when the temperature at the compressor wheel, in operation, is (relatively) high, or the first shaft may have an inserted tapped part press-fitted at an end of the shaft inside thereof, and the compressor wheel may be attached on the tapped insert by screwing.

the first shaft may have a tapped part centered by light pressure at an end of the shaft and screwed inside thereof, and the compressor wheel may be attached on the tapped part by screwing.

To not risk introducing unbalance when dismantling and reassembling the compressor wheel on its first shaft, a keying system is advantageously provided between the compressor wheel and the first shaft.

In a rotor assembly such as described here, it may also be provided that the second shaft holds, opposite the band, a turbine wheel. The latter allows, for example, recovering energy from a gaseous flow and bringing it, for example, to the compressor wheel of the first shaft. A keying system may also be provided between the turbine wheel and the second shaft.

A rotor assembly such as described above may also advantageously have the following characteristics, either singly or in combination:

the first shaft and/or the second shaft have, on the side opposite the band, a bottom in an exterior surface of which at least one tapping is made, the band has a tubular, cylindrical, and circular shape, the first shaft and/or the second shaft are each mounted end to end with the band, and/or the thrust disk forms one piece with the first shaft or the second shaft.

The present invention also relates to a motorized turbine engine characterised in that it includes:

a rotor assembly such as described above, a stator including at least one wound assembly disposed opposite the band, a first support bearing disposed facing the bearing of the first shaft to form a gas bearing, a second support bearing disposed facing the bearing of the second shaft to form a gas bearing, and a bidirectional gas thrust bearing placed on either side of the thrust disk in the rotor assembly.

According to the preferred embodiment allowing reaching high rotational rates, this present turbine engine has, for example, two gas bearings.

In an embodiment variant, this turbine engine may have a bidirectional gas thrust bearing placed on either side of a disk made on a shaft of its rotor assembly.

BRIEF DESCRIPTION OF THE DRAWINGS

Details and advantages of the present invention will become clear in the following description, made with reference to the accompanying schematic drawing on which.

DETAILED DESCRIPTION OF THE PREFERRED EMBODIMENTS

Figure 1:
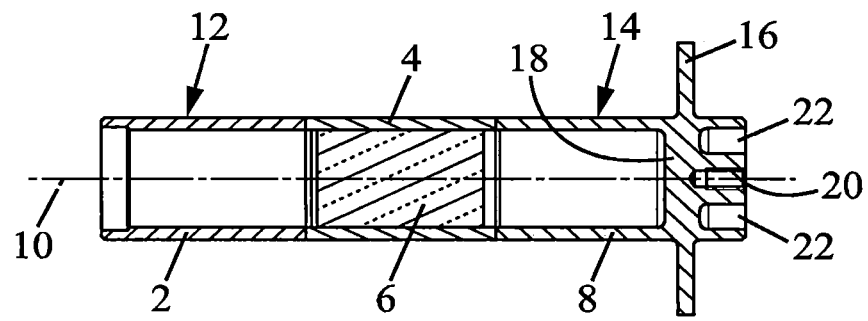
FIG. 1 is a longitudinal cross-section view of a shaft from a motorized turbine engine.

FIG. 1 shows an integral assembly formed by four distinct parts associated in a non-dismountable way. This assembly thus includes a first shaft 2, a band 4, a solid permanent magnet 6 and a second shaft 8.

The first shaft 2 is a cylindrical tubular shaft with a longitudinal axis 10 made, for example, of stainless steel. Its outer surface is machined at least on an area 12 so as to be used as a bearing in a gas bearing type contactless bearing. The machining is, of course, adapted to the type of bearing made. The diameter of the shaft at the level of the bearing influences the loading capacity of the machine in which the rotor is mounted. In the present invention, for illustrative and non-exhaustive purposes, it is indicated that the diameter of the air bearings is, for example, larger than or equal to 25 mm and is located, for example, in a range of diameters from 35 to 50 mm.

The first shaft 2 has an end welded to the band 4. The latter also has a cylindrical tubular shape. The band 4 has a longitudinal axis and the welding between the first shaft 2 and the band 4 is made such that the longitudinal axis of the band 4 is combined with that of the first shaft 2 so as to form a single longitudinal axis 10.

The band 4 tightly surrounds the magnet 6 in such a way that the two parts are secured together. Preferably, the material used to make the band 4 is a nonmagnetic material. Thus the band is, for example, made of a material commercialized under the trademark Inconel, i.e. a nickel, chromium, and iron based alloy also containing small quantities of carbon, silicon, and manganese. Such alloy has a great resistance to corrosion and useful mechanical characteristics.

The magnet 6 is a conventional magnet used as a permanent magnet in an electric motor. It advantageously has a full cylindrical shape. Its outer surface is, of course, adapted to the inner surface of the band 4. Having a solid magnet, without recess in the center, allows limiting the magnet length (measured longitudinally) since the corresponding motor couple depends particularly on the volume of this magnet. It is thus possible to limit the size of the corresponding electric motor.

On its end opposite the one receiving the first shaft 2, the band 4 is welded on the second shaft 8. The latter is, for example, also made of stainless steel. It has a general tubular cylindrical shape, closed at its end opposite the band 4. The second shaft 8 is also welded on the band 4 such that its longitudinal axis is combined with the longitudinal axis 10 of the first shaft 2 and the band 4.

The second shaft 8 also has a bearing on its outer surface. This bearing is of the same nature as the bearing of the first shaft 2. It is thus a contactless bearing, e.g. a gas bearing or magnetic bearing. It is made in an area 14 of the second shaft 8.

On the figures, the presence of a disk 16 radially protruding from the outer surface of the second shaft 8 can be noted. This disk 16 is disposed between the bearing area 14 and the end of the second shaft 8 opposite the band 4. This end of the second shaft 8 is closed by a bottom 18 in which a tapping 20 is made. In the illustrated embodiment, the bottom 18 is a solid bottom up to the outwardly oriented face and also has, in its outwardly oriented face of the second shaft 8 in which the tapping 20 is made, housings 22 in the form of longitudinal holes. As an alternative, the bottom 18 may, for example, be fully encased inside the second shaft 8 and have a centered axial boss protruding outwards wherein the tapping 20 is to be made to allow attaching the wheel by screwing.

Figure 2:
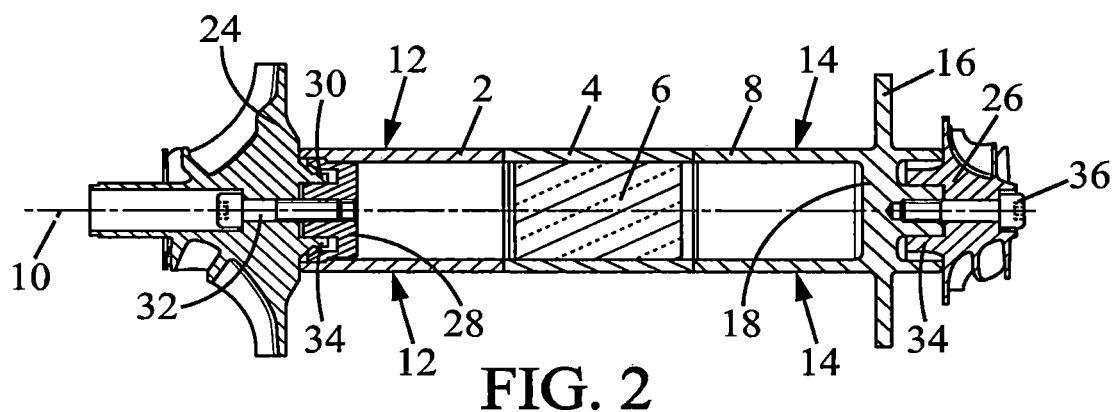
FIG. 2 illustrates a longitudinal cross-section of a first example of an integral assembly made with the shaft in FIG. 1.

FIG. 2 illustrates the integral assembly in FIG. 1 with a compressor wheel 24 mounted at the free end (i.e. opposite the band 4) of the first shaft 2 and a turbine wheel 26 mounted at the free end also opposite the band 4, of the second shaft 8.

In the embodiment in FIG. 2, the compressor wheel 24 is attached on a flange 28 which closes the first shaft 2. The flange 28 is tapped in its center and has, in the illustrated embodiment, an annular groove 30 around its central tapping.

The flange 28 may be fitted in the first shaft 2 in different ways. According to a first variant, press-fitting may be provided in the first shaft 2 by cooling, for example, the flange 28 with liquid nitrogen and by heating the first shaft 2. After mounting, the two parts are then secured together. The second variant provides, for example, that the flange 28 is threaded on a portion of its length and that the first shaft 2 is tapped at its end receiving the compressor wheel 24. The non-threaded portion of the flange 28 is, for example, fitted by light pressure inside the first shaft 2 (for example by light heating of the first shaft 2 before fitting) and then the flange, once centered, is put in its final position by screwing. Of course, other embodiments of the flange 28 and other fitting modes may be considered.

The compressor wheel 24 is then attached to the flange 28 using a screw 32 engaging with the central tapping. The compressor wheel 24 has a shoulder 34 which is centered on an inner surface of the annular groove 30 when attaching the compressor wheel 24 on the first shaft 2, or more precisely on the flange 28. A keying system may be made with pins at a shoulder 34 end and corresponding housings made at the bottom of the annular groove 30. In this way, it is possible to always guarantee the same relative positioning of the compressor wheel 24 with respect to the first shaft 2. For example, a regular disposition of housings (and pins) and adding another housing (and pin) may be provided.

The turbine wheel 26, on the other hand, is attached to the bottom 18 of the second shaft 8. A screw 36 is here provided for engaging with the tapping 20 of the bottom 18. As well as for fitting the compressor wheel 24, a keying system may be provided between the turbine wheel 26 and the second shaft 8 by equipping the turbine wheel 26 with pins and a corresponding housing motive only accepting a single possibility of fitting (e.g. several circular pins and one pin with a square cross-section and corresponding circular housings and a single square housing for the pin with a square cross-section).

Figure 3:
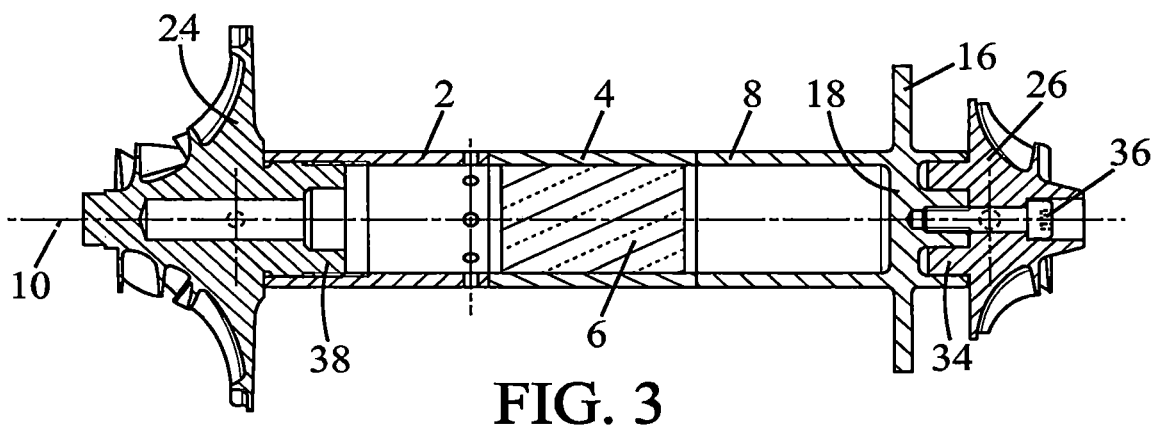
FIG. 3 is a view similar to FIG. 2 for a second example of an integral assembly.

FIG. 3 illustrates an embodiment variant of the setup of FIG. 2. Here, a turbine wheel 26 on the second shaft 8 and compressor wheel 24 on the second shaft 2 may be found.

The setup of the turbine wheel 26, as illustrated in FIG. 3, is the same as the setup presented in FIG. 2 and described hereafter.

The embodiment chosen in FIG. 3 provides screw-fitting the compressor wheel 24 directly inside the first shaft 2. For this purpose, the compressor wheel 24 has threaded means 38 engaging with a tapping made in the inner wall of the first shaft 2 at its free end.

In this embodiment, the first shaft 2 may be machined from a threaded tube. This allows reducing matter consumption, merchandising time, and efficiency cost.

In cases where the compressor wheel is made of a light alloy, in particular an aluminum-based alloy, and the shaft is made of steel, in particular a stainless steel, the high temperatures of the parts during operation of the turbine engine in which they are mounted, lead to differential dilatation. The diameter of the compressor wheel increases faster than that of the shaft. This advantageous setup thus allows obtaining clamping during operation, which is not permitted when the wheel is screwed onto the shaft.

Embodiments variants may, of course, be considered for making a larger assembly such as the one described above.

The person skilled in the art understands that the shape of the compressor wheels and the shape of the turbine wheel are given for non-exhaustive and merely illustrative example purposes. Other forms and types of setups may be considered for these wheels. The compressor wheel may also be mounted in the same way as the turbine wheel (and the turbine wheel may be mounted like the compressor wheel is mounted in FIG. 2 or FIG. 3).

Instead of having a welded assembly (first shaft, band, and second shaft), an integral assembly made of one piece in a single, preferably nonmagnetic, material may be considered.

The position of the disk, used as an axial thrust bearing, and the position of each bearing may of course vary. However, preferably, it is provided to place the disk next to the integral assembly opposite the one receiving the compressor wheel.

A rotor assembly such as described above is adapted for rotating at high rates, even higher rates than 100,000 rpm.

In order to balance the rotor assembly, the wheels (or a single wheel) are fitted on the integral assembly and the whole is balanced. To then introduce the rotor inside the corresponding turbine engine, it is required to dismount the compressor wheel and/or the turbine wheel which is (are) reassembled once the bearings of the integral assembly are placed on the corresponding support bearings. If a keying system is provided, the wheels (the wheel) then necessarily return to the relative position they had during balancing.

Due to the use of contactless bearings, no lubricant is necessary. As a result, the assembly described above and its variations may be used for feeding air to a fuel-cell (which must be very clean).

The rotor assembly such as the one described above includes less parts than comparable assemblies of the prior art. Relative to devices of the prior art with a central tie rod for supporting the stacked parts, it can also be noted that it is possible to have a solid magnet, which then generally has smaller overall dimensions.

The architecture presented allows reducing the number of stacked parts, diminishing the dimensional and geometrical tolerances, and obtaining a simpler and more reliable shape.

Of course, the invention is not limited to the embodiments described and illustrated on the figures and to the variants mentioned. It also relates to variants which are relevant to the person skilled in the art in the context of the following claims.

The invention claimed is:

1. A rotor assembly for a turbine engine with gas bearings including a solid permanent magnet with no central bore, a first shaft having at least one bearing intended for engaging with a support bearing to form a gas bearing and ensure rotational guidance of the first shaft as well as a thrust disk, the solid permanent magnet is press-fitted inside a band made of a nonmagnetic material, the band is integral with the first shaft in an extension thereof, and a second shaft has at least one bearing intended for engaging with a support bearing to form a second gas bearing and ensure rotational guidance of the second shaft, coaxially with the first shaft such that the first shaft, the band, and the second shaft form an integral assembly.

2. The rotor assembly according to claim 1, wherein the band is welded both on the first shaft and on the second shaft.

3. The rotor assembly according to claim 1, wherein the first shaft and the second shaft are made of a material different from that of the band.

4. The rotor assembly according to claim 1, wherein the first shaft and the second shaft are each a tubular shaft.

5. The rotor assembly according to claim 1, wherein the first shaft holds, opposite the band, a compressor wheel.

6. The rotor assembly according to claim 5, wherein the compressor wheel includes a threading engaging with a tapping made at one end of the first shaft.

7. The rotor assembly according to claim 5, wherein the first shaft has an inserted tapped part press-fitted at one end of the first shaft inside thereof, and the compressor wheel is attached on the tapped part by screwing.

8. The rotor assembly according to claim 5, wherein the first shaft has a tapped part which is centered by light pressure at one end of the first shaft and screwed inside thereof, and the compressor wheel is attached on the tapped part by screwing.

9. The rotor assembly according to claim 1, wherein the second shaft holds, opposite the band, a turbine wheel.

10. The rotor assembly according to claim 1, wherein the first shaft, the second shaft or both the first shaft and the second shaft has on the side opposite the band a bottom in an outer surface of which at least one tapping is made.

11. The rotor assembly according to claim 1, wherein the band is a circular cylindrical tube.

12. The rotor assembly according to claim 1, wherein the first shaft, the second shaft or both the first and second shafts are each mounted end-to-end with the band.

13. The rotor assembly according to claim 1, wherein the thrust disk forms only one piece with the first shaft or the second shaft.

14. The rotor assembly according to claim 4 wherein the first shaft holds, opposite the band, a compressor wheel and the second shaft holds, opposite the band, a turbine wheel, and wherein a keying device is provided between the first shaft and the compressor wheel, between the second shaft and the turbine wheel or both between the first shaft and the compressor wheel and between the second shaft and the turbine wheel.

15. A motorized turbine engine, comprising:
a rotor assembly according to claim 1,
a stator including at least one wound assembly disposed opposite the band, and
a bidirectional gas thrust bearing placed on either side of the thrust disk in the rotor assembly.

16. The rotor assembly according to claim 9 wherein the first shaft holds, opposite the band, a compressor wheel and the second shaft holds, opposite the band, a turbine wheel, and wherein a keying device is provided between the first shaft and the compressor wheel, between the second shaft and the turbine wheel or both between the first shaft and the compressor wheel and between the second shaft and the turbine wheel.

17. A method for manufacturing a rotor assembly for a turbine, the rotor assembly comprising a permanent magnet, a first shaft, a second shaft and a thrust disk, wherein the method comprises:
providing a part including the first shaft, a band and the second shaft, wherein the band is in an extension of the first shaft and the second shaft is coaxial with the first shaft,
providing a solid permanent magnet with no central bore,
providing the first shaft with at least one bearing configured to engage with a support bearing to form a gas bearing,
providing the second shaft with at least one bearing intended for engaging with a support bearing to form a second gas bearing, and
press-fitting the solid permanent magnet inside the band which is made of a nonmagnetic material.

* * * * *